June 12, 1956 W. M. HARKS 2,749,797
SAMPLE HOLDER
Original Filed March 21, 1950
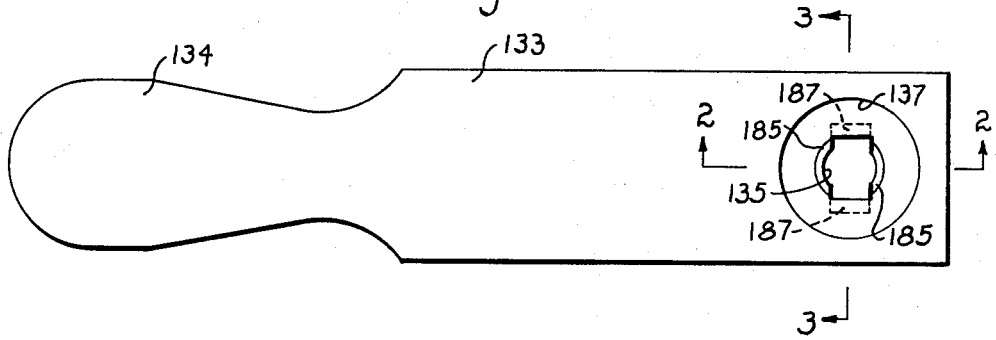
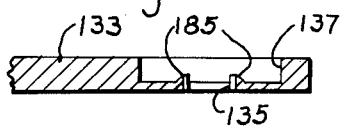
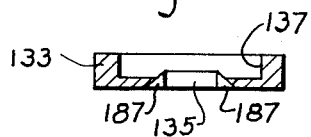
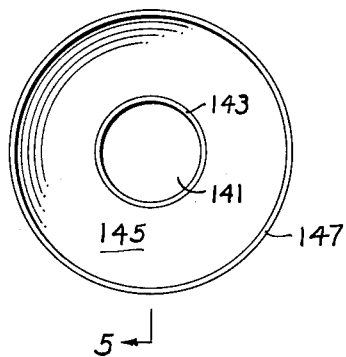
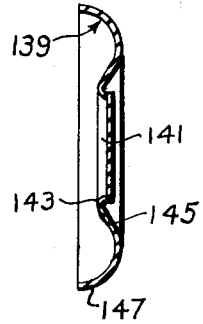
WALTER M. HARKS
*INVENTOR.*
BY Edmund W. E. Kamm
ATTORNEY

:::::::::::::::::::::::::::::::::::::::::::::::::::::::::::::::::::::

United States Patent Office 2,749,797
Patented June 12, 1956

2,749,797

SAMPLE HOLDER

Walter M. Harks, Fort Wayne, Ind., assignor to Bowser, Inc., Fort Wayne, Ind., a corporation of Indiana Original application March 21, 1950, Serial No. 150,937, now Patent No. 2,677,303, dated May 4, 1954. Divided and this application July 10, 1952, Serial No. 298,101

6 Claims. (Cl. 88—14)

This invention relates to a sample holder for an oil testing device. More specifically, it relates to a sample stick which is provided with a suitable sample holding cup which is removably mounted in the stick and which is disposed of after a single use.

An object of the invention is to provide a sample holder which is inexpensive.

Another object of the invention is to provide a sample cup which is inexpensive and which can be discarded after a single use.

A further object of the invention is to provide a sample cup which will support a predetermined quantity of sample in a predetermined location and store excess sample in a different location.

Still another object is to provide a sample cup which will automatically form a proper sample for analysis.

These and other objects will become apparent from a study of this specification and the drawings which are attached hereto, made a part hereof and in which:

Figure 1 is a plan view of the sample stick.

Figure 2 is a sectional view taken substantially on the line 2—2 of Figure 1 showing the cavity for receiving the sample cup.

Figure 3 is a sectional view taken substantially on line 3—3 of Figure 1 showing the cavity for the sample cup and the clearance slots.

Figure 4 is a top plan view of the sample cup.

Figure 5 is a sectional view of the sample cup taken substantially on the line 5—5 of Figure 4.

This application is a division of my application, Serial No. 150,937, filed March 21, 1950, now Patent Number 2,677,303, for Oil Tester.

The sample holder comprises a sample stick 133 into which is fitted a sample cup or container 139.

The stick is preferably a flat wooden paddle having a suitable width and thickness to enter the machine with which it is used.

A hole 135 is formed with its center at a predetermined distance from the one end of the stick, preferably on the longitudinal axis thereof and the hole is formed with a counterbore 137 to receive the sample cup.

The hole is bounded by a pair of diametrically opposed projections 185 which extend into the counterbore and engage the holder adjacent the cup to support and position it relative to the surfaces of the stick. The stick is preferably undercut laterally at 187 at each side of the hole so as to not impede or obstruct the rays of light which are passed obliquely through the sample as explained in the Patent Number 2,677,303 mentioned above.

The sample container or cup is preferably formed of a relatively thin, transparent, colorless plastic material. It has a circular central cup 141 which is of shallow but uniform and predetermined depth. I prefer a depth of 1/32 inch.

The relatively sharp rim 143 of the cup is connected by a conical web 145 to the upwardly curved outer rim 147. This outer rim extends considerably above the level of the rim 143 of the cup and forms a chamber to receive excess sample which overflows the rim 143. The material of the cup is preferably somewhat yieldable and the external diameter is such that the cup will be lightly and frictionally held in the bore 137.

In use, a clean cup is mounted in the bore by pressing it therein. The oil sample is then deposited in the cup 141, usually from the dip-stick or crankcase depth gauge. The cup is preferably filled to excess so that the surplus oil will run over the rim 143 and collect in the low portion formed by the conical portion 145 and the rim 147. Thus the cup will be filled to a predetermined level and the excess will be held well out of the range of the hole 137 and slots 187 through which the light from the testing machine passes.

When the test has been completed, the used cup is discharged from the stick by inserting a pencil or other instrument in the hole 135 from the bottom side of the stick.

It is obvious that various changes may be made in the form, structure and arrangement of parts without departing from the spirit of the invention. Accordingly, Applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a liquid testing means, a stick having a bore and a counterbore, a sample holder having a central sample cup and an overflow cup surrounding it, said overflow cup being of yieldable material and frictionally disposed in said counterbore and serving to locate said cup and sample in alignment with the bore.

2. In a liquid testing means, a stick having a bore and a counterbore, a pair of projections disposed to extend into the counterbore on opposite sides of the bore and a sample cup frictionally mounted in the counterbore, said cup being of yieldable material and having means for supporting the sample in axial alignment with the bore.

3. In a liquid testing means, a stick having a bore and a counterbore, a pair of projections disposed to extend into the counterbore on opposite sides of the bore transversely to the longitudinal axis of the stick, and a sample cup mounted in the counterbore, said cup having means disposed to engage said counterbore and said projections for supporting the sample in axial alignment with and in a predetermined position relative to the end of the bore.

4. In a liquid testing means, a stick having a bore and a counterbore, means defining a channel in the surface of the stick opposite the counterbore and extending substantially radially from the bore, a sample cup frictionally mounted in the counterbore, said cup having means for supporting the sample in axial alignment with and in a predetermined position relative to the end of the bore.

5. In a liquid testing means, a stick having a bore and a counterbore, means defining channels in the surface of the stick opposite the counterbore and extending substantially radially from the bore and transversely of the longitudinal axis of the stick, a sample cup mounted in the counterbore, said cup having yieldable, frictional means for supporting the sample in the counterbore in axial alignment with the bore.

6. In a liquid testing means, a stick having a bore and a counterbore, a pair of projections disposed to extend into the counterbore on opposite sides of the bore and being curved to follow the wall of said bore for a portion of its circumference, and a sample cup mounted in the counterbore, said cup having yieldable means for frictionally supporting the sample in the counterbore, on said projections and in axial alignment with the bore.

References Cited in the file of this patent

UNITED STATES PATENTS

| | | |
|---|---|---|
| 2,015,949 | Maw | Oct. 1, 1935 |
| 2,041,290 | Jackson | May 19, 1936 |
| 2,351,282 | Oliver | June 13, 1944 |
| 2,610,541 | Rowland | Sept. 16, 1952 |
| 2,621,557 | Kavanaugh | Dec. 16, 1952 |

FOREIGN PATENTS

| | | |
|---|---|---|
| 206,995 | Great Britain | Nov. 22, 1923 |
| 358,533 | Great Britain | Oct. 12, 1931 |